US008320611B2

(12) United States Patent
Alattar et al.

(10) Patent No.: US 8,320,611 B2
(45) Date of Patent: Nov. 27, 2012

(54) WATERMARKING ELECTRONIC TEXT DOCUMENTS (75) Inventors: Adnan M. Alattar, Tigard, OR (US); Osama M. Alattar, Tigard, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 13/181,072

(22) Filed: Jul. 12, 2011

(65) Prior Publication Data
US 2012/0030546 A1    Feb. 2, 2012

Related U.S. Application Data (62) Division of application No. 10/871,349, filed on Jun. 17, 2004, now Pat. No. 8,014,557.

(60) Provisional application No. 60/482,069, filed on Jun. 23, 2003, provisional application No. 60/537,054, filed on Jan. 16, 2004.

(51) Int. Cl.
*G06K 9/00* (2006.01)
(52) U.S. Cl. ....................................... 382/100
(58) Field of Classification Search ............... 382/100
See application file for complete search history.

(56) References Cited

U.S. PATENT DOCUMENTS

| | | | |
|---|---|---|---|
| 3,648,236 A * | 3/1972 | Burton | 714/782 |
| 4,790,566 A | 12/1988 | Boissier et al. | |
| 4,908,873 A | 3/1990 | Philibert et al. | |
| 5,243,423 A | 9/1993 | DeJean et al. | |
| 5,388,194 A | 2/1995 | Vogel | |
| 5,481,294 A | 1/1996 | Thomas et al. | |
| 5,481,377 A | 1/1996 | Udagawa et al. | |
| 5,515,451 A | 5/1996 | Tsuji et al. | |
| 5,579,124 A | 11/1996 | Aijala et al. | |
| 5,644,682 A | 7/1997 | Weinberger et al. | |
| 5,652,626 A | 7/1997 | Kawakami et al. | |

(Continued)

FOREIGN PATENT DOCUMENTS

| | | |
|---|---|---|
| EP | 493091 | 7/1992 |
| WO | WO0197175 | 12/2001 |
| WO | WO0201379 | 1/2002 |
| WO | WO0211326 | 2/2002 |
| WO | WO0211446 | 2/2002 |

OTHER PUBLICATIONS

Alattar, "Smart Images" Using Digimarc's Watermarking Technology, Proc. SPIE [on-line], Jan. 2000, vol. 3971, No. 25, pp. 1-10. Retrieved from http://spiedigitallibrary.org/proceedings/resource/2/psisdg/3971/1/264_1.*

(Continued)

*Primary Examiner* — Matthew Bella
*Assistant Examiner* — Dennis Rosario (57) ABSTRACT

A text watermarking method embeds an auxiliary message in an original electronic text document to form a watermarked text document. The method applies a spreading function to message symbols to spread the symbols over a carrier, which forms a modulated carrier. It maps elements of the modulated carrier to corresponding inter-word spaces in the electronic text document, and applies an embedding function to modify the corresponding inter-word spaces according to elements of the modulated carrier signal such that the modified inter-word spaces hide the modulated carrier signal in the watermarked text document. The message symbols are automatically decodable from the watermarked document without the original electronic text document. A compatible decoder extracts the auxiliary message from a printed or electronic watermarked text document. The decoder automatically measures inter-word spaces in the watermarked text document. It estimates elements of a modulated carrier signal embedded in the inter-word spaces to form an estimated modulated carrier signal, and applies a de-spreading function to the estimated modulated carrier signal to extract message symbols.

17 Claims, 3 Drawing Sheets

U.S. PATENT DOCUMENTS

| | | | |
|---|---|---|---|
| 5,689,626 | A | 11/1997 | Conley |
| 5,739,864 | A | 4/1998 | Copeland |
| 5,843,564 | A | 12/1998 | Gasper et al. |
| 5,848,155 | A | 12/1998 | Cox |
| 5,864,623 | A | 1/1999 | Messina et al. |
| 5,901,224 | A | 5/1999 | Hecht |
| 5,946,414 | A | 8/1999 | Cass et al. |
| 5,949,055 | A | 9/1999 | Fleet et al. |
| 6,044,156 | A | 3/2000 | Honsinger et al. |
| 6,086,706 | A | 7/2000 | Brassil et al. |
| 6,104,812 | A | 8/2000 | Koltai et al. |
| 6,154,484 | A | 11/2000 | Lee et al. |
| 6,185,316 | B1 | 2/2001 | Buffam |
| 6,185,683 | B1 | 2/2001 | Ginter et al. |
| 6,201,879 | B1 | 3/2001 | Bender et al. |
| 6,208,735 | B1 | 3/2001 | Cox et al. |
| 6,233,684 | B1 | 5/2001 | Stefik et al. |
| 6,263,086 | B1 | 7/2001 | Wang |
| 6,282,654 | B1 | 8/2001 | Ikeda et al. |
| 6,297,491 | B1 | 10/2001 | Mangerson |
| 6,311,214 | B1 | 10/2001 | Rhoads |
| 6,325,420 | B1 | 12/2001 | Zhang |
| 6,345,104 | B1 | 2/2002 | Rhoads |
| 6,411,392 | B1 | 6/2002 | Bender et al. |
| 6,427,020 | B1 | 7/2002 | Rhoads |
| 6,449,377 | B1 | 9/2002 | Rhoads |
| 6,456,393 | B1 | 9/2002 | Bhattacharjya et al. |
| 6,505,779 | B1 | 1/2003 | Power et al. |
| 6,557,103 | B1 | 4/2003 | Boncelet et al. |
| 6,567,534 | B1 | 5/2003 | Rhoads |
| 6,694,043 | B2 | 2/2004 | Seder et al. |
| 6,769,061 | B1 | 7/2004 | Ahern |
| 6,771,820 | B1 | 8/2004 | Oakeson |
| 6,804,377 | B2 | 10/2004 | Reed et al. |
| 6,999,598 | B2 | 2/2006 | Foote et al. |
| 7,017,043 | B1 | 3/2006 | Potkonjak |
| 7,194,106 | B2 | 3/2007 | Brundage et al. |
| 7,239,734 | B2 | 7/2007 | Alattar et al. |
| 7,555,139 | B2 | 6/2009 | Rhoads et al. |
| 7,657,064 | B1 | 2/2010 | Conwell |
| 2001/0051996 | A1 | 12/2001 | Cooper et al. |
| 2001/0054146 | A1 | 12/2001 | Carro et al. |
| 2002/0009208 | A1* | 1/2002 | Alattar et al. ............ 382/100 |
| 2002/0013794 | A1 | 1/2002 | Carro et al. |
| 2002/0048369 | A1 | 4/2002 | Ginter et al. |
| 2002/0051545 | A1 | 5/2002 | Ogilvie |
| 2002/0069218 | A1 | 6/2002 | Suli et al. |
| 2002/0101597 | A1 | 8/2002 | Hoover |
| 2002/0112171 | A1 | 8/2002 | Ginter et al. |
| 2002/0118860 | A1 | 8/2002 | Pasqua |
| 2002/0172396 | A1* | 11/2002 | Stach et al. ............ 382/100 |
| 2002/0176116 | A1 | 11/2002 | Rhoads et al. |
| 2004/0189682 | A1 | 9/2004 | Troyansky et al. |
| 2004/0236716 | A1 | 11/2004 | Carro |
| 2005/0111047 | A1 | 5/2005 | Rhoads |
| 2005/0262490 | A1 | 11/2005 | Thomborson et al. |
| 2007/0244693 | A1 | 10/2007 | Atallah et al. |

OTHER PUBLICATIONS

Su et al., Digital Watermarking of Text, Image, and Video Documents, Computer & Graphics [on-line], Dec. 1998, vol. 22, Issue 6, pp. 687-695. Retrieved from http://www.sciencedirect.com/science/article/pii/S0097849398000892.*

Marvel et al., Reliable Blind Information Hiding for Images, LEcture Notes in Computer Science [on-line], 1998, vol. 1525, pp. 48-61. Retrieved from http://www.springerlink.com/content/rh5avxhbglxdwlvm/.*

Johnson et al., Information Hiding Techniques for Steganography and Digital Watermarking: Chapter 3: A survey of steganographic techiques, 2000, Artech House Books, p. vi.*

Huang et al., Interword Distance Charges Represented by Sine Waves for Watermarking Text Images, Dec. 12, 2001, IEEE Transactions on Circuits and Systems for Video Technology, vol. 11, No. 12, pp. 1237-1245.

Amamo et al., "A Feature Calibration Method for Watermarking of Document Images," Proc. $5^{th}$ Int'l Conf. on Document Analysis and Recognition, pp. 91-94, 1999.

Brassil, "Electronic Marketing and Identification Techniques to Discourage Document Copying," Proceedings of INFOCOM '94 Conference on Computer, IEEE Comm. Soc. Conference, Jan. 12-16, 1994, pp. 1278-1287.

Brassil, "Hiding Information in Document Images," Nov. 1995, 7 pages, AT&T Bell Laboratories Technical Report.

Nakamura, Embedding Signature into Japanese Printed Documents for Copyright Protection, Information Proc. Society of Japan, Nat'l Meeting Lecture Papers 3 Mar. 15, 1995, pp. 3-203 to 3-204.

Gruhl et al., "Information Hiding to Foil the Casual Counterfeiter," Proc. $2^{nd}$ Int'l Workshop on Information Hiding, Apr. 14-17, 1998, pp. 1-15.

Boland, "Watermarking Digital Images for Copyright Protection," Fifth International Conf. on Image Processing and Its Applications, Conf. Publ. No. 410, pp. 326-330, 1995.

Cox, et al., "Secure Spread Spectrum Watermarking for Multimedia," NEC Research Institute Technical Report No. 95-10, 1995.

Tanaka et al., "Embedding Secret Information into a Dithered Multi-Level Image," IEEE, pp. 216-220, 1990.

Tanaka et al., "A Visual Retrieval System with Private Information for Image Database," Proc. Int'l Conf. on DSP Appl. & Tech., pp. 415-421, Oct. 1991.

Xydeas et al., "Embedding Data Into Pictures by Modula Masking," IEEE Transactions on Communications, 1984, vol. COM-32, No. 1, pp. 56-69.

Kawaguchi et al., "Principle and Applications of BPCS-Steganography," Proc. SPIE vol. 3528: Multimedia Systems and Applications, Nov. 2-4, 1998, pp. 464-473.

Komatsu et al., "A Proposal on Digital Watermarking in Document Image Communication and Its Application to Realizing a Signature," Electronics and Communications in Japan, Part 1, vol. 73, No. 5, 1990, pp. 22-23.

Komatsu et al., "Authentication System Using Concealed Image in Telematics," Memoirs of the School of Science and Engineering, Waseda Univ., No. 52, 1988, p. 45-60.

Nakamura et al. "A Unified Coding Method of Dithered Image and Text Data Using Micropatterns," Electronics and Communications in Japan, Part 1, vol. 72, No. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Mar. 30, 2010 final Office Action; and Nov. 30, 2010 Amendment Accompanying Request for Continued Examination; each from U.S. Appl. No. 10/792,400 (published as US 2005-0111047 A1).

* cited by examiner

Fig. 5a — Abstract- A novel MPEG-4 compressed domain video watermarking method is proposed

WATERMARKING ELECTRONIC TEXT DOCUMENTS

RELATED APPLICATION DATA

This patent application is a Divisional of U.S. application Ser. No. 10/871,349 filed Jun. 17, 2004, incorporated herein by reference in its entirety, which claims priority from Provisional Application U.S. Application 60/482,069 filed Jun. 23, 2003, incorporated herein by reference in its entirety and which claims priority from Provisional Application U.S. Application 60/537,054 filed Jan. 16, 2004, incorporated herein by reference in its entirety.

TECHNICAL FIELD

The invention relates to embedding hidden, machine-readable auxiliary information in electronic text documents, and extracting this hidden information from electronic and printed text documents.

BACKGROUND AND SUMMARY

Most companies and government agencies have a dire need for protecting sensitive information from falling into the wrong hands. Encryption, access restriction, and locking documents behind firewalls are some common techniques for protecting sensitive information. Encryption is an effective way for preventing an unauthorized person from viewing the content of a sensitive document. Nonetheless, once the document is decrypted for viewing using the secret key, an ill intentioned authorized person may save, copy, print, or transmit the unencrypted document anywhere he wants without any major difficulty. Restricting access of a document to only a few individuals works well with trustworthy individuals. But, unfortunately, it is not uncommon to find secret documents circulating outside their trusted rings or even in the public media. In this case, determining who the untrustworthy person is has often proven to be neither an easy nor a pleasant task. Firewalls are an effective means to ban casual outsiders from accessing an organization's network. They also make it difficult for a savvy computer backer to break in. Unfortunately, they cannot prevent an insider from copying a sensitive document onto a floppy disk or emailing it to an outsider using a third party internet service provider to avoid tracking.

Obviously, a comprehensive solution for insuring the security of sensitive documents cannot rely on a single technique. Instead, it must employ all the aforementioned techniques and further utilize a way to fingerprint the document. Fingerprinting here refers to the embedding of an indiscernible identifier in the document, in order to identify the owner or the recipient of the document. In this case, it does not mean cryptographically hashing the document into a signature that can be used to uniquely identify the document, although his form of hashing can form part of the data embedded in the document and can be used to detect alteration of the text. The embedded identifier can be detected and decoded from a fingerprinted document whenever and wherever the document is encountered, even after DA/AD conversion (print and scan). This can be achieved through the use of digital watermarking techniques.

Image watermarking techniques can be applied to a text document, but depending on the scheme, they can introduce a noticeable white noise in the text document. This noise is due to the binary (black and white) nature of the text document and its large white background. Moreover, image watermarking techniques are applicable to image bitmaps, which implies that the text document must first be rasterized into an image before being embedded with an image watermark.

Techniques for embedding data in text have been described in the literature. Examples include:

1. Q. Mei, E. K. Wong, and N. Memon, "Data Hiding in Binary Text Documents," *Proceedings of the SPIE, Security and Watermarking of Multimedia Contents III*, vol. 4314, San Jose, Calif., January 2001, pp. 369-375.
2. J. T. Brassil, S. Low, N. F. Maxemchuk, and L. O'Gorman, "Electronic Marking and Identification Techniques to Discourage Document Copying," *IEEE Journal on Selected Areas in Communications*, vol. 13, no. 8, October 1995, pp. 1495-1504.
3. J. T. Brassil, S. Low, and N. F. Maxemchuk, "Copyright Protection for the Electronic Distribution of Text Documents," *Proceedings of the IEEE*, vol. 87, no. 7, July 1999, pp. 1181-1196.
4. N. F. Maxemchuk, S. H. Low, "Performance Comparison of Two Text Marking Methods," *IEEE Journal of Selected Areas in Communications (JSAC)*, May 1998. vol. 16 no. 4 1998. pp. 561-572.
5. N. F. Maxemchuk, "Electronic Document Distribution," *AT&T Technical Journal*, September 1994, pp. 73-80.
6. N. F. Maxemchuk and S. Low, "Marking Text Documents," *Proceedings of the IEEE International Conference on Image Processing*, Washington, D.C., Oct. 26-29, 1997, pp. 13-16.
7. S. H. Low, N. F. Maxemchuk, and A. M. Lapone, "Document Identification for Copyright Protection Using Centroid Detection," *IEEE Transactions on Communications*, March 1998, vol. 46, no. 3, pp 372-381.
8. S. H. Low and N. F. Maxemchuk, "Capacity of Text Marking Channel," *IEEE Signal Processing Letters*, vol. 7, no. 12, December 2000, pp. 345-347.
9. Ding Huang, Hong Yan, "Interword Distance Changes Represented by Sine Waves for Watermarking Text Images," *IEEE Transactions on Circuits and Systems for Video Technology*, vol. 11, no. 12, pp. 1237-1245, December 2001.

This disclosure describes a method for embedding hidden data in text documents. It also describes methods for automatically extracting the hidden information from electronic text documents, and scanned images of printed text documents. The embedding method forms a message, performs error correction coding on that message (e.g., repetition, BCH, turbo, block, convolution, etc. coding), spreads the error correction coded message over a carrier signal (e.g., a pseudo random carrier signal), and then adjusts spaces or distances between words and lines based on the elements of the spread signal. The spreading may be achieved by selecting corresponding sets of carrier signals, XORing the message with sets of carrier signals, convolving the message with carrier signals, multiplying the message with carrier signals, etc.

The spaces may be adjusted up or down to encode ones and zeros. The spaces can be quantized into quantization bins associated with the symbol to be encoded at the particular location in the document.

The detector operates either on the electronic version of the text document, or on an image scanned from a printed version of the document. The latter poses more challenges because of the distortions introduced by the printing and scanning processes, including noise and geometric distortion.

The detector measures the distances of the spaces between words and lines and maps these distances into symbol estimates. It then performs de-spreading and error correction decoding to retrieve the embedded message. One version of the detector predicts the modification of the space at an embedding location by computing an average space distance from spaces in the document and subtracting this average distance from the actual to predict whether the distance was adjusted up or down (corresponding to a one or zero, for example). Other forms of prediction filters may be used as well, such as a median filter, La Placian filter or some other filter based on a comparison of the space distance at the embedding location with neighboring space distances. Another version of the detector maps the measured distances into quantization bins, and determines the symbol value depending on which bin the measured distance corresponds to.

In applications where the document is distorted, such as reading from a scanned image of a printed document, the detector performs synchronization to determine geometric orientation of the document relative to its original state at the time of embedding. In one implementation, it uses the direction and/or length of the text lines as a reference to compute the orientation. It also identifies the top, bottom, left and right margins. In particular, in one implementation, the detector computes horizontal and vertical signatures. The signatures are one dimensional projections of the document image, summing pixels in a particular direction.

The digital watermarking method can be used for a number of applications:

1. carrying a forensic tracking code to track the document to its printer, creator, or other source device or person;
2. carrying an index to a database with more information or programmatic actions to be associated with or performed on the document;
3. carrying a hash or other authentication data used to cross check other information derived from the document to detect and locate changes made to the document;
4. carrying one or more instructions that control machine or programmatic processing on the document, including copy control (e.g., controlling number of allowable copies, who may view the document, who may receive the document, who may transfer the document, etc.), document routing (e.g., via an email system, fax system, or other document transfer system). More document management applications are described in U.S. patent application Ser. No. 10/639,598, filed Aug. 11, 2003, which is herein incorporated by reference.

Particular embedding methods described in this document do not require the original document for detecting the watermark, and they work with documents that contain aligned left, centered, aligned right, or justified paragraphs as well as regular or irregular line spacing. Justified paragraphs are common in electronic documents. To force the ends of the last word of each line to lie precisely on the right margin, popular word processor programs automatically and systematically spread the words in each line. Irregular line spacing happens naturally as a result of in-line insertion of mathematical symbols and other objects. To accommodate the tallest object in each line, these word processors automatically adjust the spacing between the lines as necessary.

The invention provides methods for embedding auxiliary data into electronic text documents, and related methods for automatically reading the auxiliary data from electronic or printed text documents.

One aspect of the invention is a method of embedding an auxiliary message in an original electronic text document to form a watermarked text document. The method applies a spreading function to message symbols to spread the symbols over a carrier, which forms a modulated carrier. It maps elements of the modulated carrier to corresponding inter-word spaces in the electronic text document, and applies an embedding function to modify the corresponding inter-word spaces according to elements of the modulated carrier signal such that the modified inter-word spaces hide the modulated carrier signal in the watermarked text document. The message symbols are automatically decodable from the watermarked document without the original electronic text document.

Another aspect of the invention is a method of decoding an auxiliary message in a watermarked text document. This method automatically measures inter-word spaces in the watermarked text document. It estimates elements of a modulated carrier signal embedded in the inter-word spaces to form an estimated modulated carrier signal, and applies a de-spreading function to the estimated modulated carrier signal to extract message symbols.

Further features will become apparent with reference to the following detailed description and accompanying drawings.

BRIEF DESCRIPTION OF THE DRAWINGS

FIG. 5b shows the horizontal signature of the image segment shown in FIG. 5a. FIG. 5c shows the locations of the detected spaces between the words in the line of text shown in FIG. 5a.

DETAILED DESCRIPTION

Our method applies error correction and a spreading function to auxiliary data symbols to improve the robustness of embedded data symbols hidden by adjusting word and/or line spacing in an electronic text document. This method can be used to embed variable message symbols robustly such that the data is recoverable automatically, even after distortions applied by the word processor and distortions resulting from printing and scanning the document. In one particular implementation, we apply BCH error coding techniques and spread spectrum modulation to combat the effects of irregular word or line spacing commonly found in text documents. The technique used for irregular line spacing is similar to that for irregular word spacing. Therefore, to avoid undue redundancy, our description focuses mainly on word spacing.

Figure 1:
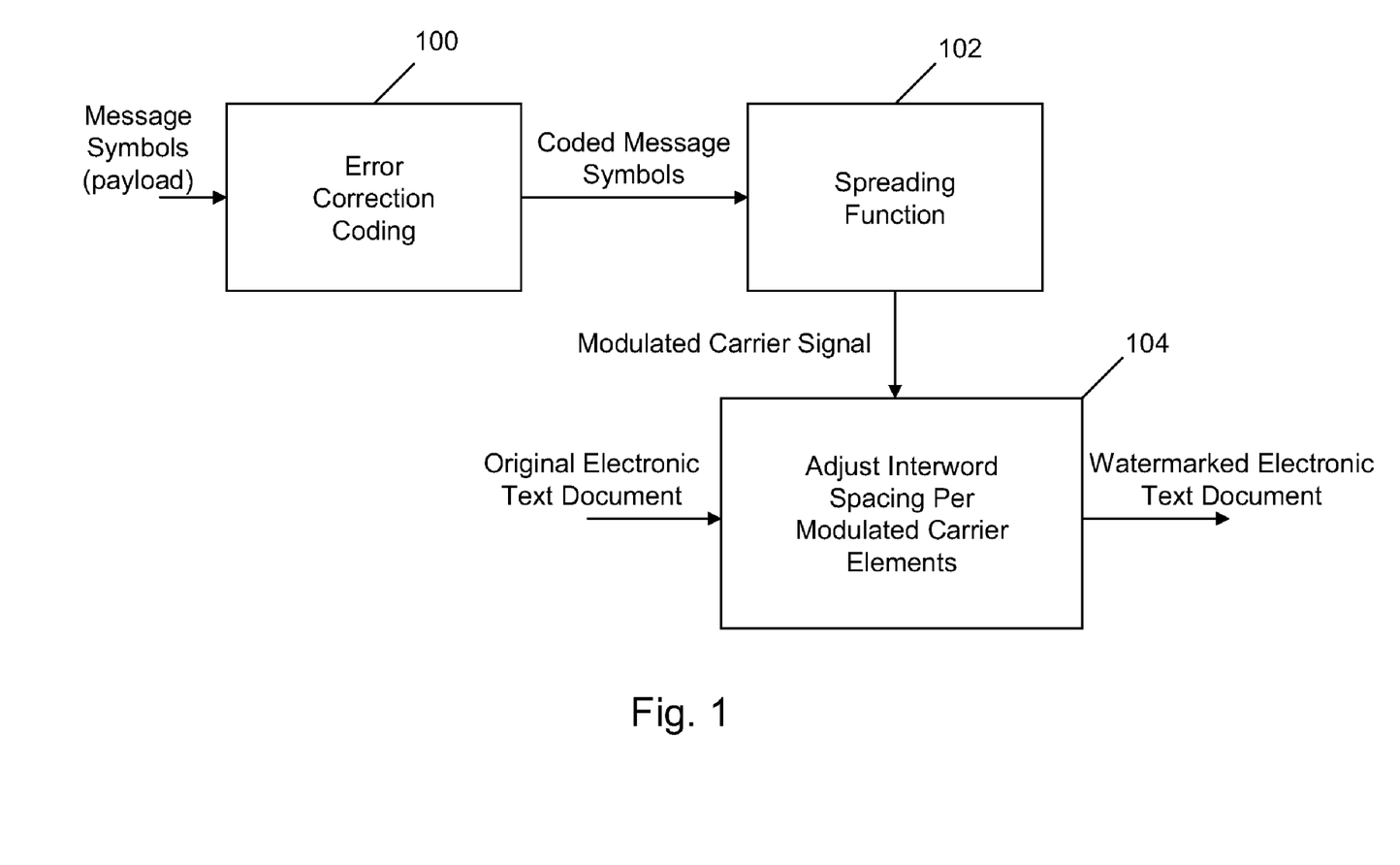
FIG. 1 illustrates an embedding process to hide an auxiliary message in an electronic text document.

FIG. 1 illustrates an embedding process to hide an auxiliary message in an electronic text document. The embedding process starts by using an error correction coding (100) to transform the message symbols in an auxiliary message into error correction coded message symbols. In one implementation, the embedder uses a BCH error coding technique to protect the payload. Depending on the application, other forms of error correction codes may be used. Other forms of error correction coding may be used in the alternative, including other types of block codes, convolutional codes, turbo codes, concatenated codes, etc. The auxiliary message or "payload" may be comprised of binary, M-ary, or other symbols.

Next, the embedder uses a spreading function (102) to spread the error correction coded symbols over a carrier. This spreading function creates a watermark signal in the form of a modulated carrier signal. There are a variety of ways to implement the spreading function, depending on the nature of the message symbols and carrier. The spreading function modulates the carrier with the message symbols by multiplying, XOR'ing, convolving, shifting (e.g., frequency or phase shifting) or otherwise distributing the symbols over elements of the carrier signal. The carrier signal may be implemented as a spreading code, such as a pseudorandom number sequence. For example, in one implementation, a unique m-sequence is used to spread each of the error correction coded bits to form the watermark. Other forms of carrier signals may be used, and the carrier signal may have random or pseudo random properties, or may have a periodic structure, a structure adapted to the document, or some other structure. The carrier signal may be independent or dependent on the attributes of the text document.

The elements of the watermark signal are mapped to locations within the document representing inter-word and/or inter-line spaces. This mapping may be a uniform or random pattern and may be derived from a key. An embedding function (104) then modifies the spacing at that location based on the value of the watermark signal element mapped to that location. In one implementation, the watermark signal elements are spread bits (chips) produced by modulating the m-sequence carrier with the error correction coded message bits. The spread bits (chips) are embedded into the text document by slightly increasing or decreasing the spaces between words (104). The document is scanned from top to bottom, and each space is slightly increased or decreased by a small delta according to the value of its corresponding watermark bit. In one implementation, positive changes in spacing convey a binary one value, while negative changes in spacing convey a binary zero value. Other embedding schemes may be used that use more than two states per embedding location, e.g., M-ary states to convey one of M symbols per each embedding location. For example, the inter-word spacing may be quantized into bins corresponding to two or more message symbols. To embed message symbols in this scheme, the message symbol value is used to select the appropriate set of quantization bins, and in turn, a spacing is selected from the selected set that is closest to the current spacing in the document. The quantization bins can be adjusted to convey more states, and thus more message capacity, or to convey fewer states (such as a binary antipodal scheme) to convey less data with more robustness to distortion.

Our implementation uses a binary antipodal scheme. In particular, if the bit is zero the space is decreased, but if the bit is one the space is increased. Increasing the value of the delta increases the strength of the watermark, but the delta should be kept small enough so that when a space between words is increased or decreased, the words are reasonably separated from each other.

A typical double-spaced text, written in an 11 points Times New Roman font on an 8½×11 inch page with 1" margins all around, contains about 25 lines. Each line contains an average of 13 words. Therefore, there are an average of 12 spaces between words per line, resulting in about 300 spaces between words per page. If a 16-bit spreading sequence is used to spread each bit, then an 18-bit payload can be hidden in each page. This payload is enough for 262,144 different IDs, but the document will be very susceptible to printing and scanning noise. If a BCH code is used to guard against noise, then the number of allowed IDs will decrease significantly.

Table (1) below gives the size of the allowed payload and the number of errors that can be corrected by different BCH codes. Theoretically, the (15,5) BCH code provides the most protection, but allows the least payload size. It allows the embedding of only 32 IDs, but can correct up to 3 errors. On the other hand, the (15,11) BCH code provides the largest payload size but the least protection. It can correct only one error, but allows the embedding of 2048 different IDs. The (7,4) BCH code strikes a balance between protection and payload size. It can correct one error in 4 bits. Hence, when two (7,4) BCH codes are concatenated to protect 8 bits, together they can correct 2 errors, while allowing the embedding of 256 unique IDs.

A single-spaced page contains about double the number of spaces that a double-spaced page contains. Hence, it allows the embedding of about double the number of bits, which substantially increases the number of allowed IDs. The ID space can also be increased by allowing the embedding process to use the spaces from multiple consecutive pages to embed one ID. However, this requires crossing the page boundary, which would complicate the decoding process. After all, a large ID space may not be necessary for fingerprinting sensitive documents, which are usually distributed to a small number of people. Also, the same IDs can be used with different documents, since different documents need not have unique IDs.

TABLE 1

| BCH Code | Length | Payload size | Parity Bits | Number of Errors can be corrected | Number of IDs |
|---|---|---|---|---|---|
| (7, 4) | 7 | 4 | 3 | 1 | 16 |
| (15, 11) | 15 | 11 | 4 | 1 | 2048 |
| (15, 7) | 15 | 7 | 8 | 2 | 128 |
| (15, 5) | 15 | 5 | 10 | 3 | 32 |

Table 1 depicts an example of payload size, number of allowed IDs, and number of bits that can be corrected for different BCH codes.

Figures 2, 3:
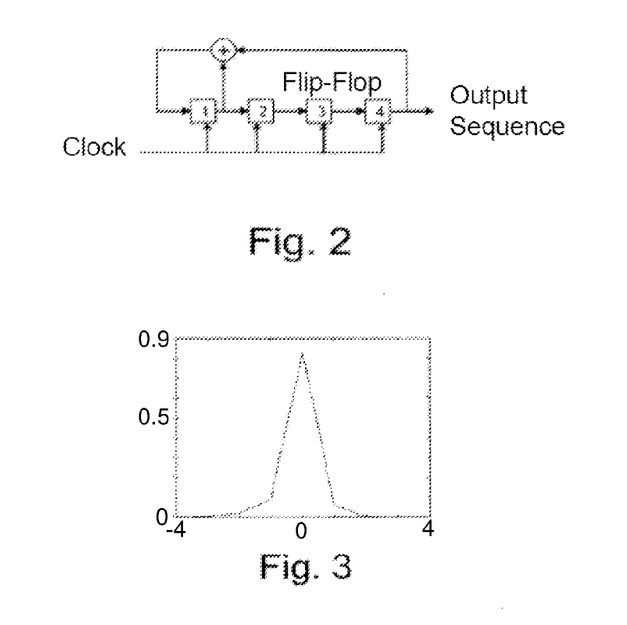
FIG. 2 is a diagram illustrating an example of a circuit for generating a signal used to spread an auxiliary message before embedding it into a text document.
FIG. 3 is a diagram of the probability distribution of line spacing noise due to line justification in a text document.

The 16-bit spread spectrum code can be generated using the 4-bit shift register shown in FIG. 2. It generates an m-sequence of period 16, which we denote by m(n). The m-sequence has the desired correlation properties for use with a correlation-based detector, since its autocorrelation is a delta function. Now, the spreading code, c(n), can be generated from m(n) as follows:

$$c(n)=2m(n)-1 \quad (1)$$

This function converts the range of the m-sequence from $\{0,1\}$ to $\{-1,1\}$. If we denote each payload bit by b, then applying the spread spectrum technique to the payload can be expressed by $$w(n)=b*c(n) \quad (2)$$

where w(n) is a 16 bit spread spectrum sequence representing the bit b.

One way to implement the embedding process is by using a macro that interfaces with the word processor program. In this case, adjusting the spacing between the words includes detecting the white spaces and increasing or decreasing their widths. If the document is justified, this will often trigger the word processor to re-adjust the inter-word spacing to maintain justification. Consequently, this may cause a ripple effect in which words will be moved from one line to the next. It is possible to avoid this ripple effect by slightly adjusting the distance between the characters of each word in every line in a way similar to that described in S. H. Low and N. F. Maxemchuk, "Capacity of Text Marking Channel," *IEEE Signal Processing Letters*, vol. 7, no. 12, December 2000, pp. 345-347.

If $ows_{i,j}$ represents the width of the $j^{th}$ original white spaces in the $i^{th}$ line and $nws_{i,j}$ represents its new width after watermarking, then the sum of these widths before and after watermarking is given by $$osw_i = \sum_{j=1}^{N_i} ows_{i,j} \text{ and } nsw_i = \sum_{j=1}^{N_i} nws_{i,j},$$

respectively. If $wl_{i,j}$ represents the width of the $j^{th}$ word in the $i^{th}$ line, then the sum of the widths of all the words in that line is given by $$swl_i = \sum_{j=1}^{N_i+1} wl_{i,j}.$$

To compensate for the difference between $nsw_i$ and $osw_i$, the width of each word in a line is adjusted to $\hat{wl}_{i,j} = wl_{i,j} + \Delta_{i,j}$, where $\Delta_{i,j}$ is a very small number calculated according to the following formula:

$$\Delta_{i,j} = \begin{cases} \left\lfloor (nsw_i - osw_i)\frac{wl_{i,j}}{swl_i} \right\rfloor & \text{if } (nsw_i - osw_i) \geq 0 \\ \left\lceil (nsw_i - osw_i)\frac{wl_{i,j}}{swl_i} \right\rceil & \text{if } (nsw_i - osw_i) < 0 \end{cases}$$

The above process can also be implemented covertly at the level of the printer driver, such as a driver for a postscript printer. The word processor usually produces a postscript file that contains instructions describing the page. The printer interprets these instructions and correctly prints the page. By modifying the instructions in the postscript file to induce the effect described above, the printer will print a watermarked document.

Fingerprinting a printed document is a little bit harder than fingerprinting an electronic document. The process is similar to the process described below for detecting the watermark from a printed document. In this process, a printed document is scanned, and then operated on by an image processor to identify the lines and the spaces between the words. Once these spaces are identified, each word can be extracted and slightly shifted. The same process can be used to identify and modify the spaces between the characters of each word in order to compress or expand the word and maintain paragraph justification. During the process, extra care must be applied in order to not leave any artifacts.

We now describe detecting the watermark from an electronic document. As in embedding a watermark, detecting a watermark can be achieved using a macro that interfaces with a word processor. The detector starts by measuring and recording the distances, $nws_{i,j}$, between every two consecutive words. Before watermarking, $ows_{i,j}$ in each line is almost the same. The word processor usually adjusts these distances slightly to justify the line. Therefore, the average, $\overline{nws_{i,j}}$, of $nws_{i,j-1}$, and $nws_{i,j+1}$, is a good prediction of $ows_{i,j}$. Hence, $\overline{nws_{i,j}}$ is computed and subtracted from each of the recorded distances to estimate the $n^{th}$ sample, $w(n)$, of the watermark signal. The resulting watermark estimates, $\hat{w}(n)$, are then segmented into segments of 16 samples each. Each of these segments is correlated with the original m-sequence to retrieve a payload bit. Finally, the BCH decoding is performed on the payload bits to correct any possible errors.

The estimate, $\hat{w}(n)$, of the $n^{th}$ sample of the watermark signal can be written as $$\hat{w}(n) = w(n) - (w(n+1) + w(n-1))/2 + \phi(n) \quad (4)$$

where $\phi(n)$ denotes a random noise. For electronic documents, $\phi(n)$ is purely due to the irregular spacing between words before watermarking. FIG. 3 shows the probability distribution of $\phi(n)$ for a justified text written in an 11 point Times New Roman font. FIG. 3 indicates that the noise $\phi(n)$ is a zero mean, Gaussian noise with a variance of 0.23. It should be noted here that $\phi(n)$ is assumed zero for unjustified text. For a scanned document, $\phi(n)$ also includes printing and scanning noise.

The term $(w(n+1)+w(n-1))/2$ is another source of noise that should have a virtually no effect on the detector. Substituting $w(n)$ from equation (2) into equation (4) results in the following equation:

$$\hat{w}(n) = bc(n) - (bc(n+1) + bc(n-1))/2 + \phi(n) \quad (5)$$

Applying the correlation detector to equation (5) results in $$\sum_{n=1}^{N} \hat{w}(n)c(n) = b\sum_{n=1}^{N} c(n)c(n) - \tag{6}$$

$$\frac{1}{2}\sum_{n=1}^{N} bc(n+1)c(n) + \frac{1}{2}\sum_{n=1}^{N} bc(n-1)c(n) + \sum_{n=1}^{N} \phi(n)c(n)$$

where N is the length of the spreading code c(n). Since c(n) is an m-sequence, the second and third terms on the right-hand side of equation (6) are zeros. This is because the autocorrelation of the m-sequence is a delta function. The last term on the right-hand side of equation (6) represents a low magnitude noise, $\eta(n)$, because multiplying the spreading sequence with a constant has the effect of spreading the power of the constant over a much wider bandwidth. Hence, equation (6) can be simplified to $$\sum_{n=1}^{N} \hat{w}(n)c(n) = b + \eta(n) \tag{7}$$

Now, the value b of the watermark bit can be obtained by applying the following threshold to the correlation results $$b = \begin{cases} 1 & \sum_{n=1}^{N} \hat{w}(n)c(n) \geq 0 \\ -1 & \sum_{n=1}^{N} \hat{w}(n)c(n) < 0 \end{cases} \tag{8}$$

There a number of possible variations to this decoding scheme. For example, other predictors of the original inter-word distance can be derived as a function of the distances between neighboring words. One predictor is a weighted average or average. Non-linear filters may be used as well. For example, a positive change in the inter-word distance is predicted when the inter-word distance is greater than one or more of the neighboring inter-word distances. Conversely, a negative change in the inter-word distance is predicted when the inter-word distance is less than one or more of the neighboring inter-word distances.

The predicted inter-word distance is used to compute estimates of elements in the modulated carrier signal. If different embedding functions are used, the estimates of the modulated carrier signal will be computed differently. For example, if the embedding function employs a quantization scheme to adjust the inter-word distances, then the decoder maps the measured inter-word distances into quantization bins corresponding to symbol values.

While our scheme uses both spreading functions and error correction, it is not necessary to use both for all applications. Spreading functions may be used without error correction, and vice versa. For example, a quantization embedding scheme may be combined with an error correction scheme, without using a spreading function.

Detecting a Watermark from a Printed Document

Figure 4A:
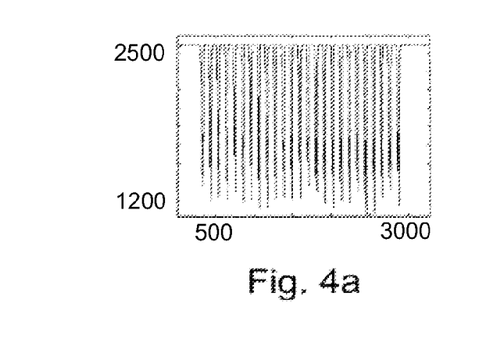
FIG. 4a illustrates the vertical signature of a typical printed text document that has been optically scanned and converted to a black and white image.
Figure 4B:
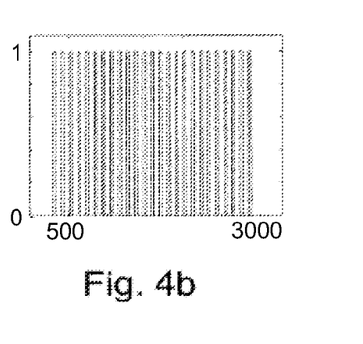
FIG. 4b shows the locations of the extracted lines from the same document.

A process of decoding of the watermark from a printed document is summarized as follows:

1. Scan the printed document at a reasonable quality and a reasonable resolution. The higher the quality and the resolution, the better the detection results.
2. Convert the image into a binary image by properly thresholding it. The value of the threshold can be determined from the image histogram, which is a bimodal. Assign 1 to any value above the threshold and 0 to any value below the threshold. Hence the text will be assigned the zero value.
3. Correct any discrepancy between the orientation of the scanned document and that of the electronic document. For this purpose, the detector can use the direction of the lines in the scanned document as a reference. Normally, in the intended application, the user would carefully and properly position the printed document on the scanner. This would cause only slight discrepancies in the orientation, which would not be hard to correct.
4. Extract the lines of the scanned document. This can be achieved by computing the vertical signature, where the vertical signature, v(i), of the image I(i, j) is $$v(i) = \sum_{j=1}^{W} I(i, j) \quad (9)$$

where W denotes the width of the image I(i, j). FIG. 4a shows the vertical signature of a typical text document scanned at 300 dpi then converted to a black and white image. FIG. 4b shows the locations of the extracted lines from the same document, and Table 2 lists the y-coordinates and widths of all detected lines. These locations are determined by thresholding the signature v(i), and then recording the locations of the valleys.

TABLE 2

Y-coordinates and widths of the lines detected in a typical text page.

| Line Number | Y-Coordinate | Width |
|---|---|---|
| 1 | 310 | 35 |
| 2 | 415 | 36 |
| 3 | 521 | 36 |
| 4 | 629 | 33 |
| 5 | 733 | 35 |
| 6 | 847 | 28 |
| 7 | 952 | 27 |
| 8 | 1055 | 30 |
| 9 | 1154 | 37 |
| 10 | 1260 | 36 |
| 11 | 1366 | 35 |
| 12 | 1471 | 35 |
| 13 | 1576 | 36 |
| 14 | 1690 | 27 |
| 15 | 1787 | 35 |
| 16 | 1891 | 36 |
| 17 | 1997 | 36 |
| 18 | 2103 | 36 |
| 19 | 2217 | 27 |
| 20 | 2315 | 34 |
| 21 | 2419 | 36 |
| 22 | 2526 | 35 |
| 23 | 2632 | 36 |
| 24 | 2739 | 35 |
| 25 | 2854 | 27 |

Figure 5A:
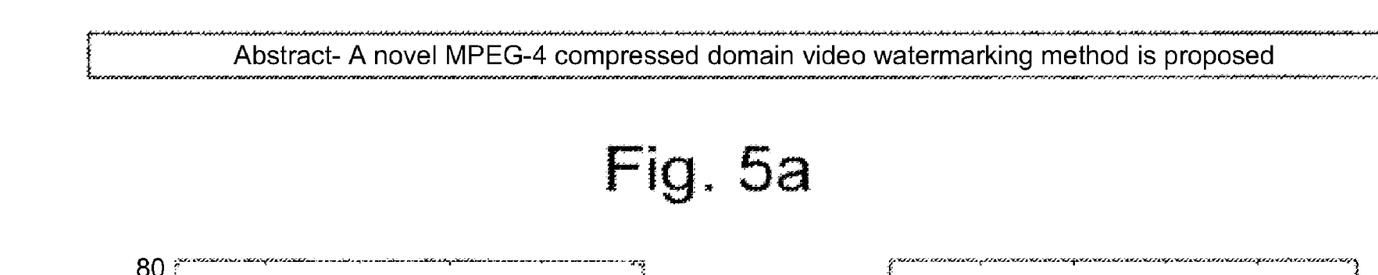
FIG. 5a shows an image segment around an example line of text in a typical text document.
Figure 5B:
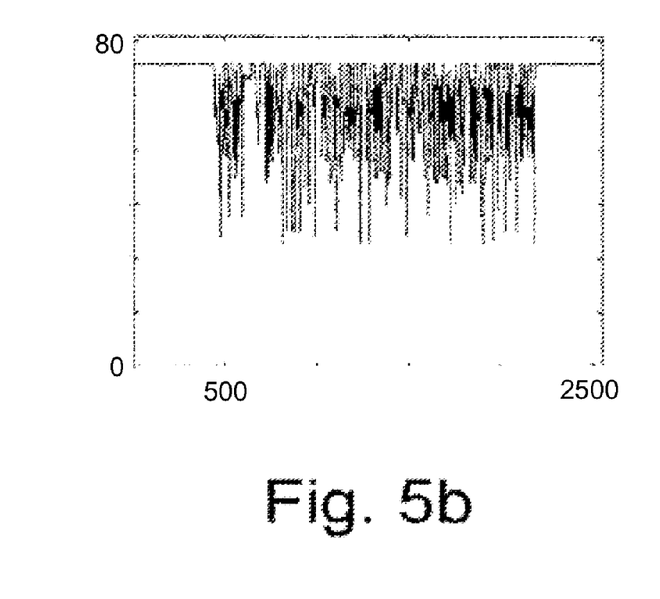
Figure 5C:
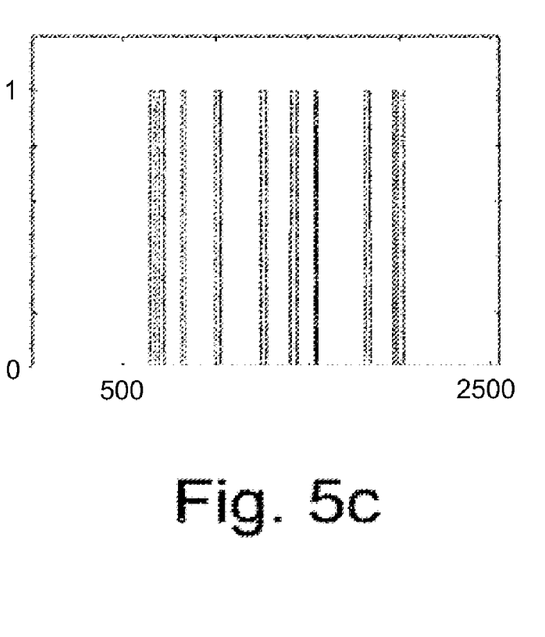

5. Detect and extract the spaces between every two consecutive words. This can be achieved by computing the horizontal signature, h(j), of a small image strip S(i, j) around each line as follows $$h(j) = \sum_{i=1}^{H} S(i, j) \quad (10)$$

where H denotes the height of the image strip S(i, j). FIG. 5a shows the image segment around a line in a typical text document. FIG. 5b shows the horizontal signature of the image segment, which is shown in FIG. 5a. The distances between the words can be detected from the horizontal signature by detecting the mountains in FIG. 5b, which shows the locations of extracted spaces indicated by 1. Very wide and very narrow mountains should be ignored. Very wide mountains are attributed to the page margins, and very narrow mountains are attributed to spaces between characters within the words. FIG. 5c shows the location of the detected spaces between the words in the line shown in FIG. 5a. Table 3 lists the x-coordinates and widths of all the detected spaces.

TABLE 3

X-coordinates and widths of all detected spaces in the line shown in FIG. 5b.

| | Space Number | | | | | | | | | |
|---|---|---|---|---|---|---|---|---|---|---|
| | 1 | 2 | 3 | 4 | 5 | 6 | 7 | 8 | 9 | 10 |
| X-Coordinate | 645 | 692 | 816 | 997 | 1242 | 1405 | 1535 | 1806 | 1967 | 2011 |
| Space Width | 20 | 28 | 15 | 27 | 28 | 30 | 15 | 27 | 16 | 12 |

6. Concatenate all the measured spaces from all the lines and proceed in the same way as in the case of the electronic document; i.e., correlate every 16 segments with the spreading sequence to retrieve the watermark bit; then decode the watermark bits with a BCH decoder to correct any error and retrieve the payload bits.

We have implemented the embedding and detecting methods described above for fingerprinting electronic text documents including aligned and justified documents by varying the spacing between the words. We implemented both the embedder and the detector using macros that interface with Microsoft Word. We used several configurations for the length of the spreading sequence and the use of the BCH code. In one configuration, we used a 32-bit m-sequence and an 8-bit payload (256 ID space), but we did not use error-correcting codes. The 8-bit payload is sufficient for tracking a document and identifying its original recipient for an organization with up to 256 employees. The m-sequence was generated with a shift register similar to that shown in FIG. 2, but with 5 flip-flops and two feedback branches, one branch after flip-flop #1 and the other after flip-flop #5. We initialized the shift register with 16.

We tested our algorithm with a text document written in 11 point Times New Roman font. The detection rate was 100% when the algorithm was tested with an unaltered marked word processing file. A similar detection rate was obtained when the algorithm was tested with slightly reformatted text. Such reformatting includes changing the font size and type, replacing words, center, left, or right aligning of the text, and changing the left and right margins of the page. Text editing operations such as deleting and inserting a word produced diverse results. In many cases, detection was successful because the spread spectrum technique is robust to local errors, especially when such errors occur near the ends of the spreading sequence. In this case, a large portion of the spread sequence is left intact, which allows the correlator to recover the embedded bit. However, when the error is near the center, neither of the resulting portions is long enough to successfully recover the embedded bit.

In another configuration, we used the (15,7) BCH code to protect the document from double errors. This required reducing the spreading sequence from 32 bits to 16 bits, in order to fit the 15 bit code in a double-spaced page. This step is not necessary for a single-spaced page, since it contains enough spaces. The 7-bit payload is sufficient for tracking a document and identifying its original recipient for an organization with up to 128 employees. We generated the m-sequence using the generator shown in FIG. 2 with an initial state of 8. The detection rate was also 100% when the algorithm was tested with an unaltered, marked word processing file. However, close inspection of the results indicated that 40% of the IDs had some errors that were corrected by the BCH code. Most of these errors were single errors, but a few were double errors. This indicates that reducing the spreading sequence from 32 to 16 has a negative effect on error rate.

We found that the spreading sequence and the payload can be improved by replacing the BCH with a concatenate (7,4) BCH code. The concatenated BCH code will allow for 8-bit payload and will allow for increasing the spreading sequence to 20 bits for the same size document. The 8-bit payload allows the embedding of 256 different IDs. An increase in the length of the spreading sequence should reduce the probability of error before the error correction is applied.

We also used Matlab to implement the procedure described above for detecting the lines and measuring the spaces between the words of each line. Our preliminary test results indicated that the algorithm was able to correctly detect and measure all the spaces in the printed documents.

Concluding Remarks

We have presented a new method for fingerprinting a sensitive document, in order to identify its original recipient whenever the document is found. This method may also be used to carry other types of auxiliary data, such as an index to a database entry or electronic file, control instructions (e.g., instructions used to control rendering, use or transfer of the document), program code, document metadata, etc. One implementation of the method encodes data by adjusting the distances between the words or the distances between the lines of the text. This implementation is particularly suited for centered, left and right aligned, and justified text as well as text with irregular spacing between lines. Unlike the algorithms proposed in prior literature, our implementation uses a spreading function and error correction techniques, and it does not need the original document for detection. A spread spectrum technique guards against noise due to paragraph justification or irregular line spacing. The BCH error correction technique guards against printing and scanning noise. Simulation results showed that the algorithm is resilient to some document reformatting, such as changing the font and changing the margins. Also, our preliminary results of detecting and measuring the distances between words and between lines from a printed document are promising.

Having described and illustrated the principles of the technology with reference to specific implementations, it will be recognized that the technology can be implemented in many other, different, forms. To provide a comprehensive disclosure without unduly lengthening the specification, applicants incorporate by reference the patents documents referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

The invention claimed is:

1. A method comprising:
   measuring inter-word spaces in a document;
   estimating a modulated carrier signal embedded in the inter-word spaces to form an estimated modulated carrier signal, wherein estimating the modulated carrier signal comprises predicting original inter-word spaces in the document before an auxiliary message was encoded into the document, and estimating the modulated carrier signal based on the predicted original inter-word spaces and measured inter-word spaces; and
   despreading the estimated modulated carrier signal to extract message symbols.

2. The method of claim 1, wherein predicting original inter-word spaces comprises computing an inter-word space of the predicted original inter-word spaces at a particular location as a function of neighboring inter-word spaces.

3. The method of claim 1, wherein estimating the modulated carrier signal comprises mapping measured inter-word spaces into quantization bins corresponding to a set of auxiliary message symbols.

4. The method of claim 1, wherein despreading the estimated modulated carrier signal comprises demodulating the message symbols from the estimated modulated carrier signal using a carrier signal.

5. The method of claim 4, wherein demodulating the message symbols comprises performing a correlation with the carrier signal.

6. The method of claim 1, further comprising error correction decoding the extracted message symbols.

7. The method of claim 6, wherein error correction decoding comprises Bose Ray-Chaudhuri Hocquenghem (BCH) decoding.

8. The method of claim 1, further comprising:
   receiving a digital image scan of the document;
   compensating for a discrepancy in orientation of the digital image scan and the document using a direction of lines of text in the document.

9. The method of claim 8, further comprising measuring inter-word spaces by determining distances between image peaks along the direction of lines of text.

10. A device comprising:
    a processor configured to
    measure inter-word spaces in a document;
    estimate a modulated carrier signal embedded in the inter-word spaces to form an estimated modulated carrier signal, wherein the processor is configured to estimate the modulated carrier signal in part by predicting original inter-word spaces in the document before an auxiliary message was encoded into the document, and estimating the modulated carrier signal based on the predicted original inter-word spaces and measured inter-word spaces; and
    despread the estimated modulated carrier signal to extract message symbols.

11. The device of claim 10, wherein predicting original inter-word spaces comprises computing an inter-word space of the predicted original inter-word spaces at a particular location as a function of neighboring inter-word spaces.

12. The device of claim 10, wherein the processor is configured to estimate the modulated carrier signal in part by mapping measured inter-word spaces into quantization bins corresponding to a set of auxiliary message symbols.

13. The device of claim 10, wherein the processor is configured to despread the estimated modulated carrier signal in part by demodulating the message symbols from the estimated modulated carrier signal using a carrier signal.

14. The device of claim 10, wherein the processor is configured to error correction decode the extracted message symbols.

15. The device of claim 10, further comprising:
    a receiver configured to receive a digital image scan of the document;
    the processor further configured to compensate for a discrepancy in orientation of the digital image scan and the document using a direction of lines of text in the document.

16. A non-transitory computer readable medium having instructions stored thereon, the instructions comprising:
    measuring inter-word spaces in a document;
    estimating a modulated carrier signal embedded in the inter-word spaces to form an estimated modulated carrier signal, wherein estimating the modulated carrier signal comprises predicting original inter-word spaces in the document before an auxiliary message was encoded into the document, and estimating the modulated carrier signal based on the predicted original inter-word spaces and measured inter-word spaces; and
    despreading the estimated modulated carrier signal to extract message symbols.

17. The non-transitory computer readable medium of claim 16, wherein predicting original inter-word spaces comprises computing an inter-word space of the predicted original inter-word spaces at a particular location as a function of neighboring inter-word spaces.

* * * * *